(12) United States Patent
Bonderson

(10) Patent No.: US 8,620,855 B2
(45) Date of Patent: Dec. 31, 2013

(54) USE OF TOPOLOGICAL CHARGE MEASUREMENTS TO CHANGE BETWEEN DIFFERENT QUBIT ENCODINGS

(75) Inventor: Parsa Bonderson, Santa Barbara, CA (US)

(73) Assignee: Microsoft Corporation, Redmond, WA (US)

( * ) Notice: Subject to any disclaimer, the term of this patent is extended or adjusted under 35 U.S.C. 154(b) by 1042 days.

(21) Appl. No.: 12/549,754

(22) Filed: Aug. 28, 2009

(65) Prior Publication Data

US 2010/0264910 A1  Oct. 21, 2010

Related U.S. Application Data

(60) Provisional application No. 61/170,227, filed on Apr. 17, 2009.

(51) Int. Cl.
G06F 15/00 (2006.01)
G06F 15/18 (2006.01)

(52) U.S. Cl.
USPC ............................................. 706/62; 977/933

(58) Field of Classification Search
USPC ............................................. 706/62; 977/933
See application file for complete search history.

(56) References Cited

U.S. PATENT DOCUMENTS

| | | | |
|---|---|---|---|
| 7,018,852 B2 | 3/2006 | Wu | |
| 7,250,624 B1 | 7/2007 | Freedman | |
| 7,427,771 B2 | 9/2008 | Freedman | |
| 7,529,717 B2 | 5/2009 | Vala | |
| 7,781,754 B2 * | 8/2010 | Loss et al. | 257/9 |
| 2005/0133780 A1 * | 6/2005 | Azuma | 257/13 |
| 2007/0170952 A1 * | 7/2007 | Freedman et al. | 326/5 |
| 2007/0180586 A1 * | 8/2007 | Amin | 977/755 |
| 2008/0086438 A1 * | 4/2008 | Amin et al. | 706/33 |
| 2008/0224726 A1 * | 9/2008 | Freedman et al. | 326/6 |
| 2009/0079421 A1 * | 3/2009 | Freedman et al. | 324/207.2 |
| 2009/0278046 A1 * | 11/2009 | Allen et al. | 250/336.1 |
| 2011/0238378 A1 * | 9/2011 | Allen et al. | 702/186 |
| 2012/0005456 A1 * | 1/2012 | Berkley et al. | 712/1 |

OTHER PUBLICATIONS

Nayak et al. "Non-abelian anyons and topological quantum computation", PACS, 2008, pp. 1183-1159.*
Langford et al. Demonstration of a simple entangling optical gate and its use in Bell-state analysis, PACS,2005, 4 pages.*
Di Vincenzo, "The physical implementation of quantum computation", IBM reasearch center, 2000, 9 pages.*
Shor, Introduction to quantum algorithms, Mathematics subject classification, 2001, 17 pages.*

(Continued)

*Primary Examiner* — Kakali Chaki
*Assistant Examiner* — Vincent Gonzales
(74) *Attorney, Agent, or Firm* — Lee & Hayes, PLLC

(57) ABSTRACT

A method for changing qubit encoding for implementation of a quantum computational gate is disclosed. Such a method may include providing first and second qubits encoded in a plurality of non-abelian anyons according to a first encoding scheme. The first encoding scheme may not be suitable for implementing a certain topologically protected quantum computational gate, such as an entangling gate, for example. Successive topological charge measurements may be performed on at least a subset of the anyons until the qubits are encoded according to a second encoding scheme. The second encoding scheme may be different from the first encoding scheme, and may be suitable for implementing the gate.

20 Claims, 2 Drawing Sheets

(56) References Cited

OTHER PUBLICATIONS

A. Stern, "Non-Abelian states of matter", Nature, vol. 464, Mar. 2010, pp. 187-193.*

Georgiev, Lachezar S.; Topologically Protected Quantum Gates for Computation with Non-Abelian Anyons in the Pfaffian Quantum Hall State; 6 pages; Published: Jul. 5, 2006, 5 pages; http://arxiv.org/pdf/cond-mat/0607125v3.

Sarma et al.; Topologically-Protected Qubits from a Possible Non-Abelian Fractional Quantum Hall State Published: Dec. 14, 2004; http://arxiv.org/pdf/cond-mat/0412343v2, 5 pages.

Bonderson et al.; Interferometry of non-Abelian Anyons, Published: Jul. 28, 2007, 62 pages. http://arxiv.org/pdf/0707.4206v2.

Bonderson et al.; Measurement-Only Topological Quantum Computation via Anyonic Interferometry, Published: Aug. 14, 2008, 57 pages.; http://arxiv.org/pdf/0808.1933v2.

Averin et al.; Quantum Computation with Quasiparticles of the Fractional Quantum Hall Effect, Published: Oct. 10, 2001, 7 pages.; http://www.ee.sunysb.edu/~serge/ARW-5/Sample.doc.

Willett et al.; Measurement of filling factor 5/2 quasiparticle interference: observation of e/4 and e/2 period oscillations; Bell Laboratores, Alcatel-Lucent; 26 pages.

Hou et al.; "Wormhole" geometry for entrapping topologically-protected qubits in non-Abelian quantum Hall states and probing them with voltage and noise measurements; Mar. 6, 2006, 5 pages.

Bravyi, Sergey; Universal Quantum Computation with the $v= 5/2$ Fractional Quantum Hall State; IBM Watson Research Center; 17 pages, 2005.

Bishara et al., "Non-Abelian Interferometer", Sep. 2009, Phys. Review B, vol. 80, 15 pages.

Bravyi, "Universal Quantum Computation with the $v= 5/2$ Fractional Quantum Hall State", IBM Watson Research Center; 17 page, Nov. 2005.

* cited by examiner

USE OF TOPOLOGICAL CHARGE MEASUREMENTS TO CHANGE BETWEEN DIFFERENT QUBIT ENCODINGS

CROSS-REFERENCE TO RELATED APPLICATIONS

This application claims benefit under 35 U.S.C. §119(e) of provisional U.S. patent application Ser. No. 61/170,227, filed Apr. 17, 2009, the disclosure of which is incorporated herein by reference.

BACKGROUND

Quasiparticles of the $\upsilon=5/2$ fractional quantum Hall (FQH) state are known as Ising anyons. Evidence supporting the $\upsilon=5/2$ FQH state having non-Abelian anyons described by the Ising anyon model may be found, for example, at R. L. Willett, et al., *Measurement Of Filling Factor 5/2 Quasiparticle Interference: Observation Of Charge e/4 And e/2 Period Oscillations*, and W. Bishara, et al., *The Non-Abelian Interferometer*, copies of which are provided in the Appendix hereof, and the disclosures of which are incorporated herein by reference.

Though Ising anyons obey non-Abelian statistics, they do not have computationally universal braiding. That is, braiding transformations alone cannot generate a computationally universal gate set. Thus, in order to use them for quantum computation, it would be desirable to supplement the usual topologically-protected gates, which may be obtained either by braiding anyons or by using measurement-only anyonic quantum computation to generate braiding transformations without moving computational anyons. Measurement-only anyonic quantum computation is described and claimed in U.S. patent application Ser. No. 12/187,850, the disclosure of which is incorporated herein by reference.

It is well known that Ising anyons allow for the so-called "Clifford group" of gates to be implemented in a topologically-protected manner. However, the full set of Clifford gates cannot be obtained using only braiding operations for a given encoding of qubits in an Ising anyon. If one could switch between encodings, then one would be able to obtain all the Clifford gates. For example, entangling gates cannot be obtained via braiding operations when one qubit is encoded in four anyons, whereas if two qubits are encoded in six anyons, then entangling gates can be obtained via braiding operations.

SUMMARY

Disclosed herein is a process for changing qubit encoding. Such a process can be used to generate topologically protected entangling gates for Ising anyons for any encoding by switching to a more convenient encoding, implementing the gate, and then switching back to the original encoding. Though described herein with reference to Ising anyons and the $\upsilon=5/2$ FQH state, the disclosed systems and methods are not limited to Ising anyons nor to the $\upsilon=5/2$ FQH state.

DETAILED DESCRIPTION

As described herein, topological charge measurements may be used to change between different encodings of qubits in computational anyons. Such a process may be used to obtain gates that cannot ordinarily be generated in certain encodings, but which can be generated in other encodings. That is, this process may be used to change the encoding of a qubit from one in which a certain gate ordinarily may not be generated to one in which the gate may be generated.

It is well known that a qubit may be encoded in a plurality of quasiparticles, or "anyons," which may be formed in an incompressible $\upsilon=5/2$ fractional quantum Hall (FQH) fluid. The anyons may be isolated on respective antidots formed in the FQH fluid. The anyons may be non-abelian anyons, such as Ising anyons, for example.

As disclosed herein, a topological charge measurement may be performed to change the qubit encoding of a pair of qubits encoded in a plurality of non-abelian anyons. A quantum computational gate may be implemented after the encoding is changed. The initial qubit encoding may be unsuitable for implementing the gate. However, after the encoding is changed, the gate may be implemented. The gate to be implemented may be a topologically protected quantum computational gate, such as an entangling gate, for example. Examples of an entangling gate include the well-known Control(Z) and Control(NOT) gates. Another example is the diag[1 i i 1], which can be implemented in any encoding other than the one-qubit-in-four-anyons encoding.

Figure 1B:
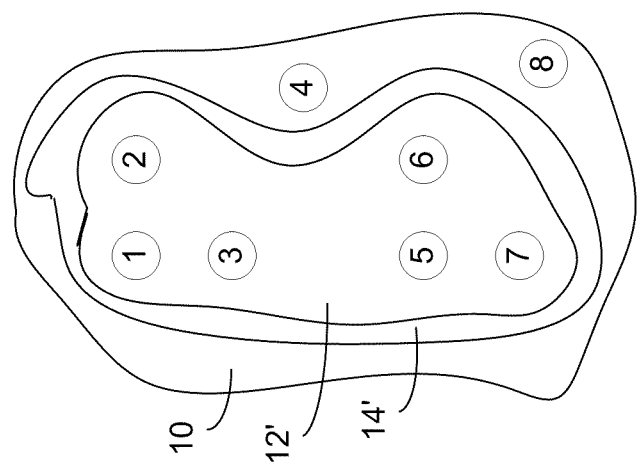
FIG. 1B depicts a subsequent encoding of the plurality of qubits after a topological charge measurement has been performed.
Figure 1A:
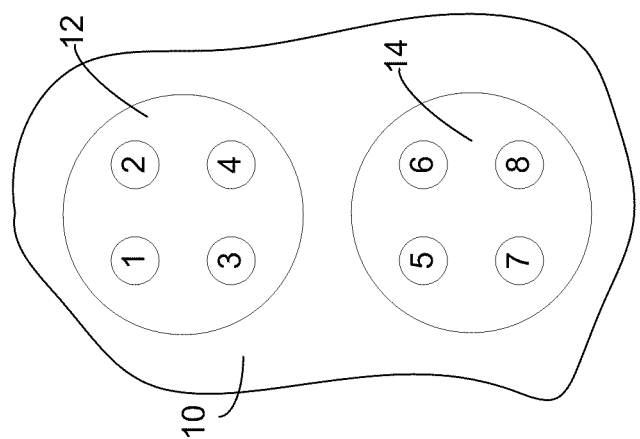
FIG. 1A depicts an initial encoding of a plurality of qubits in computational anyons.

As shown in FIG. 1A, first and second qubits 12, 14 may be encoded in a plurality of non-abelian anyons 1-8 according to a first encoding scheme. For example, each of the qubits 12, 14 may be encoded in respective sets of four non-abelian anyons 1-8. The anyons 1-8 may be disposed in a fractional quantum Hall fluid 10.

Successive topological charge measurements may be performed on at least a subset of the anyons until the first and second qubits 12', 14' are encoded in a set of six non-abelian anyons (FIG. 1B). A quantum computational gate may be implemented while the first and second qubits are encoded in the set of six non-abelian anyons.

After the gate is implemented, successive topological charge measurements may be performed on at least a subset of the anyons to re-encode each of the first and second qubits according to the initial encoding scheme (e.g., back into respective sets of four non-abelian anyons).

Figure 2:
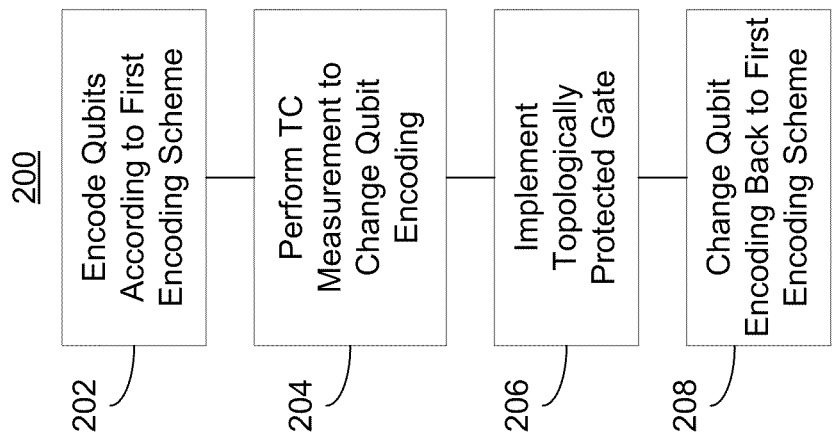
FIG. 2 is a flowchart of a method for implementing a phase gate by changing between different qubit encodings.

FIG. 2 is a flowchart of a method 200 for implementing an entangling gate by changing between different qubit encodings. At 202, the qubits may be set to known, initial states, which can be obtained using a topologically-protected gate. Such gates may be generated either by physically braiding computational anyons around each other, or by using a measurement-only technique, such as described and claimed in U.S. patent application Ser. No. 12/187,850, that produces the same transformations without moving the computational anyons. Braiding transformations are unitary operators applied to the non-local non-Abelian Hilbert space. As described in U.S. patent application Ser. No. 12/187,850, to perform a measurement on a topological qubit, an interferometer may be created and run for a period of time sufficient to project the qubit into a basis state.

At 204, a "forced" measurement, as described in U.S. patent application Ser. No. 12/187,850, may be performed on certain anyons to change the encoding of the qubits. For example, a forced measurement may be performed on certain anyons to cause two qubits, each of which is initially encoded in a respective set of four anyons, to be encoded in six of the original eight anyons. More generally, this process may be used to change from any encoding to any other encoding.

Forced measurement is a probabilistically determined adaptive series of measurements in which the measurements to be carried out are predetermined, but the number of times that they need to be carried out is probabilistically determined by the first attainment of the desired measurement outcome. In sum, a forced measurement refers to taking successive topological charge measurements until a desired result is achieved.

The amount of time for which the measurement system should be run to take a topological charge measurement may be determined from the initial encoding of the qubits and the calibration details of the measurement system itself. An example of such a measurement system is an interferometer, as described in U.S. patent application Ser. No. 12/187,850.

For measurement-only topological quantum computation in fractional quantum Hall systems, a quasi-linear array of stationary anyons may be set up, and double point-contact interferometers may be used to perform interferometrical topological charge measurements. A section of an array in a Hall bar may be used with one or more interferometers measuring the topological charges of different anyons. The FQH edge may be deformed into the bulk by depleting the Hall fluid in order to construct interferometers enveloping anyons to be measured.

After a measurement is completed, the edge protrusions may be retracted, destructing the interferometer. Topological charge measurement outcomes may be distinguished by the observed values of current that tunnels an interferometer. Leads may be attached to the Hall bar to measure the tunneling current across the interferometer.

After the encoding is changed, it may be possible to generate a gate that could not ordinarily have been generated (e.g., via braiding or measurement-only techniques) given the initial encoding. For example, certain gates may be generated in six anyon encoding that cannot ordinarily be generated in eight-qubit encoding. An example of such a gate is the controlled NOT gate, which is included in the Clifford group, but cannot be obtained for Ising anyons via braiding alone for all qubit encodings. At 206, such a gate may be implemented.

At 208, after the gate is implemented, successive topological charge measurements may be taken to change the qubit encoding back to first encoding scheme.

Exemplary Computing Arrangement

Figure 3:
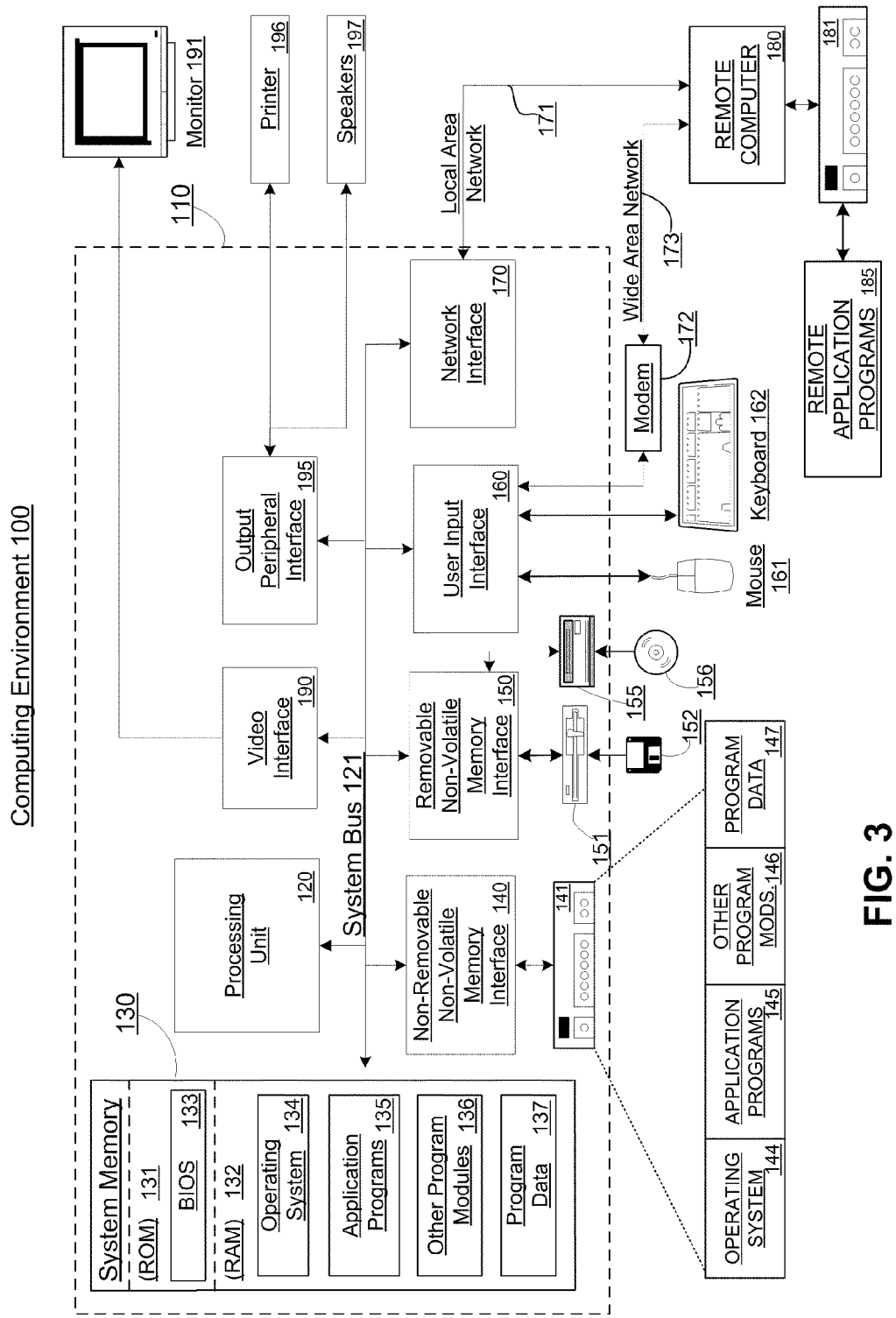
FIG. 3 depicts an example computing environment in which aspects of the example embodiments may be implemented.

FIG. 3 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 3, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 3 illustrates operating system 134, application programs 135, other program modules 136, and program data 137.

The computer 110 may also include other removable/non-removable, volatile/nonvolatile computer storage media. By way of example only, FIG. 3 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 3, provide storage of computer readable instructions, data structures, program modules and other data for the computer 110. In FIG. 3, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 3. The logical connections depicted in FIG. 3 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for implementing a quantum computational gate, the method comprising:
    encoding first and second qubits in accordance with a first encoding scheme that utilizes a first cardinal number of a plurality of non-abelian quasiparticles;
    changing, via performance of at least one topological charge measurement, the encoding of the first and second qubits to a second encoding scheme that utilizes a second cardinal number of the plurality of non-abelian quasiparticles, wherein the first and the second cardinal numbers are different; and
    implementing a quantum computational gate with the qubits after the encoding is changed.

2. The method of claim 1, wherein the qubits are unsuitable for implementing the gate before the encoding is changed, and suitable for implementing the gate after the encoding is changed.

3. The method of claim 2, wherein the gate is a topologically protected quantum computational gate.

4. The method of claim 3, wherein the gate is an entangling gate.

5. The method of claim 1, wherein the non-abelian quasiparticles are Ising quasiparticles.

6. The method of claim 1, wherein the non-abelian quasiparticles are disposed in a $\upsilon=5/2$ fractional quantum Hall fluid.

7. The method of claim 1, wherein the first cardinal number is eight, and before the encoding is changed, each of the first and second qubits is encoded in a respective subset of four of the non-abelian quasiparticles.

8. The method of claim 7, wherein the second cardinal number is six, after the encoding is changed, the first and second qubits are encoded in a subset of six of the non-abelian quasiparticles.

9. A method for changing qubit encoding for implementation of a quantum computational gate, the method comprising:
    providing first and second qubits, wherein the first and second qubits are encoded in a first cardinal number of non-abelian quasiparticles of a plurality of non-abelian quasiparticles according to a first encoding scheme; and performing successive topological charge measurements on at least a subset of the plurality of non-abelian quasiparticles until the first and second qubits are encoded in a second cardinal number of non-abelian quasiparticles of the plurality of non-abelian quasiparticles according to a second encoding scheme that is different from the first encoding scheme, wherein the first and second cardinal numbers are different.

10. The method of claim 9, wherein the second encoding scheme is suitable for implementing a topologically protected quantum computational gate, and the first encoding scheme is not suitable for implementing the gate.

11. The method of claim 10, wherein the first cardinal number is eight, and according to the first encoding scheme, each of the first and second qubits is encoded in a respective subset of four of the non-abelian quasiparticles.

12. The method of claim 11, wherein the first cardinal number is eight, and according to the second encoding scheme, the first and second qubits are encoded in a subset of six of the non-abelian quasiparticles.

13. A method for implementing a quantum computational gate, the method comprising:

providing first and second qubits, wherein each of the first and second qubits is encoded in a respective set of four non-abelian quasiparticles disposed in a fractional quantum Hall fluid;

performing successive topological charge measurements on at least a subset of the non-abelian quasiparticles until the first and second qubits are encoded in a set of six non-abelian quasiparticles; and implementing a quantum computational gate while the first and second qubits are encoded in the set of six non-abelian quasiparticles.

14. The method of claim 13, wherein the quantum computational gate is a topologically protected gate.

15. The method of claim 13, wherein the quantum computational gate is an entangling gate.

16. The method of claim 15, wherein the quantum computational gate is a Control(Z) gate.

17. The method of claim 15, wherein the quantum computational gate is a Control(NOT) gate.

18. The method of claim 13, wherein the non-abelian quasiparticles are Ising quasiparticles.

19. The method of claim 13, wherein the fractional quantum Hall fluid is in a $\upsilon=5/2$ fractional quantum Hall state.

20. The method of claim 13, further comprising:

performing successive topological charge measurements on at least a subset of the non-abelian quasiparticles, after the quantum computational gate is implemented, to encode each of the first and second qubits in respective sets of four non-abelian quasiparticles.

* * * * *